(12) United States Patent
Murphy

(10) Patent No.: US 9,696,879 B2
(45) Date of Patent: Jul. 4, 2017

(54) TAB SCRUBBING USING NAVIGATION GESTURES

(71) Applicant: Google Inc., Mountain View, CA (US)

(72) Inventor: Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 13/691,598

(22) Filed: Nov. 30, 2012

(65) Prior Publication Data

US 2015/0193099 A1 Jul. 9, 2015

Related U.S. Application Data

(60) Provisional application No. 61/698,515, filed on Sep. 7, 2012.

(51) Int. Cl.
*G06F 3/033* (2013.01)
*G06F 3/0484* (2013.01)
(Continued)

(52) U.S. Cl.
CPC ............ *G06F 3/0484* (2013.01); *G06F 3/017* (2013.01); *G06F 3/0481* (2013.01);
(Continued)

(58) Field of Classification Search
CPC ........... G06F 2203/04808; G06F 3/017; G06F 3/0481; G06F 3/04815; G06F 3/0482;
(Continued)

(56) References Cited

U.S. PATENT DOCUMENTS

| | | | |
|---|---|---|---|
| 5,140,678 | A | 8/1992 | Torres |
| 5,564,002 | A | 10/1996 | Brown |
| 6,239,798 | B1 | 5/2001 | Ludolph et al. |
| 6,628,309 | B1 | 9/2003 | Dodson et al. |
| 6,727,892 | B1 | 4/2004 | Murphy |
| 6,862,712 | B1 | 3/2005 | Nakagawa et al. |
| 7,543,234 | B2 | 6/2009 | Daniels et al. |
| 7,594,185 | B2 | 9/2009 | Anderson et al. |
| 7,681,143 | B2 | 3/2010 | Lindsay et al. |
| 7,735,018 | B2 | 6/2010 | Bakhash |
| 7,797,641 | B2 | 9/2010 | Karukka et al. |

(Continued)

FOREIGN PATENT DOCUMENTS

| | | |
|---|---|---|
| EP | 536579 A2 | 4/1993 |
| JP | 2010-134738 A | 6/2010 |

(Continued)

OTHER PUBLICATIONS

"Grazing Browser—Features," retrieved from <http://grazingbrowser.com/features.php>, Oct. 5, 2011.

(Continued)

*Primary Examiner* — Linh K Pham
(74) *Attorney, Agent, or Firm* — McDermott Will & Emery LLP

(57) ABSTRACT

The subject matter of this specification can be implemented in, among other things, a method for tab switching. The method includes a step for receiving a multi-finger swipe gesture event for a computing device in a direction corresponding to a list of tabs of a user interface displayed on a screen of the computing device. The method also includes a step for determining a distance of movement corresponding to the received multi-finger swipe gesture. The method also includes a step for determining a next tab for selection from the list of tabs, where a distance from a current tab to the next tab is proportional to the determined distance of movement. The method also includes a step for providing instructions for a graphical update of the user interface, where the graphical update displays contents of a user interface associated with the determined next tab.

21 Claims, 13 Drawing Sheets

(51) Int. Cl.
  *G06F 3/01* (2006.01)
  *G06F 3/0485* (2013.01)
  *G06F 3/0481* (2013.01)
  *G06F 3/0483* (2013.01)
  *G06F 3/0488* (2013.01)
  *G06F 3/0482* (2013.01)

(52) U.S. Cl.
  CPC .......... *G06F 3/0482* (2013.01); *G06F 3/0483* (2013.01); *G06F 3/0485* (2013.01); *G06F 3/04815* (2013.01); *G06F 3/04883* (2013.01); *G06F 2203/04808* (2013.01)

(58) Field of Classification Search
  CPC .... G06F 3/0483; G06F 3/0484; G06F 3/0485; G06F 3/04883; G06F 3/0488; G06F 3/0416; G06F 3/04886
  USPC .................................................. 715/863, 738
  See application file for complete search history.

(56) References Cited

U.S. PATENT DOCUMENTS

| | | | |
|---|---|---|---|
| 7,904,826 B2 | 3/2011 | Vronay et al. | |
| 7,954,064 B2 | 5/2011 | Forstall et al. | |
| 8,046,712 B2 | 10/2011 | Landman et al. | |
| 8,166,415 B2 | 4/2012 | Cisler et al. | |
| 8,214,768 B2 | 7/2012 | Boule et al. | |
| 8,239,785 B2 | 8/2012 | Hinckley et al. | |
| 8,543,935 B2 | 9/2013 | Duffy | |
| 8,578,290 B2 | 11/2013 | Amadio et al. | |
| 8,605,034 B1* | 12/2013 | Roy | 345/156 |
| 8,638,292 B2 | 1/2014 | Kawakami et al. | |
| 9,507,588 B2 | 11/2016 | Arriola et al. | |
| 2003/0189597 A1 | 10/2003 | Anderson et al. | |
| 2005/0125739 A1 | 6/2005 | Thompson et al. | |
| 2005/0188329 A1 | 8/2005 | Cutler et al. | |
| 2005/0273466 A1 | 12/2005 | Yoon | |
| 2006/0026535 A1 | 2/2006 | Hotelling et al. | |
| 2006/0036962 A1 | 2/2006 | Jobs et al. | |
| 2006/0161861 A1 | 7/2006 | Holecek et al. | |
| 2006/0224991 A1 | 10/2006 | Stabb et al. | |
| 2007/0038955 A1 | 2/2007 | Nguyen | |
| 2008/0034314 A1 | 2/2008 | Louch et al. | |
| 2008/0040692 A1 | 2/2008 | Sunday et al. | |
| 2008/0165152 A1 | 7/2008 | Forstall et al. | |
| 2008/0168401 A1 | 7/2008 | Boule et al. | |
| 2008/0195961 A1 | 8/2008 | Bae et al. | |
| 2008/0297483 A1 | 12/2008 | Kim et al. | |
| 2008/0320419 A1 | 12/2008 | Matas et al. | |
| 2009/0077501 A1 | 3/2009 | Partridge et al. | |
| 2009/0178007 A1 | 7/2009 | Matas et al. | |
| 2009/0204925 A1 | 8/2009 | Bhat et al. | |
| 2009/0228820 A1 | 9/2009 | Kim et al. | |
| 2009/0237367 A1 | 9/2009 | Ryu et al. | |
| 2009/0237372 A1 | 9/2009 | Kim et al. | |
| 2009/0265628 A1 | 10/2009 | Bamford et al. | |
| 2009/0267909 A1 | 10/2009 | Chen et al. | |
| 2009/0322692 A1 | 12/2009 | Kim et al. | |
| 2010/0020035 A1 | 1/2010 | Ryu et al. | |
| 2010/0031185 A1 | 2/2010 | Wilson et al. | |
| 2010/0039400 A1 | 2/2010 | Jang | |
| 2010/0044121 A1 | 2/2010 | Simon et al. | |
| 2010/0107046 A1 | 4/2010 | Kang et al. | |
| 2010/0125817 A1 | 5/2010 | Kang et al. | |
| 2010/0211872 A1 | 8/2010 | Rolston et al. | |
| 2010/0222112 A1 | 9/2010 | Han | |
| 2010/0251154 A1 | 9/2010 | Chang et al. | |
| 2010/0298034 A1 | 11/2010 | Shin et al. | |
| 2010/0313126 A1 | 12/2010 | Jung et al. | |
| 2010/0317503 A1 | 12/2010 | Subramanian et al. | |
| 2011/0004821 A1 | 1/2011 | Miyazawa et al. | |
| 2011/0037720 A1 | 2/2011 | Hirukawa et al. | |
| 2011/0039603 A1 | 2/2011 | Kim et al. | |
| 2011/0047459 A1 | 2/2011 | Van Der Westhuizen | |
| 2011/0050591 A1* | 3/2011 | Kim et al. | 345/173 |
| 2011/0050594 A1 | 3/2011 | Kim et al. | |
| 2011/0050602 A1 | 3/2011 | Jeong et al. | |
| 2011/0061021 A1 | 3/2011 | Kang et al. | |
| 2011/0078624 A1 | 3/2011 | Missig et al. | |
| 2011/0083098 A1 | 4/2011 | Cisler et al. | |
| 2011/0083105 A1* | 4/2011 | Shin | G06F 3/0482 715/830 |
| 2011/0087982 A1 | 4/2011 | McCann et al. | |
| 2011/0128241 A1 | 6/2011 | Kang et al. | |
| 2011/0167350 A1 | 7/2011 | Hoellwarth | |
| 2011/0179368 A1 | 7/2011 | King et al. | |
| 2011/0179386 A1 | 7/2011 | Shaffer et al. | |
| 2011/0184738 A1 | 7/2011 | Kalisky et al. | |
| 2011/0208712 A1 | 8/2011 | Jones et al. | |
| 2011/0209057 A1 | 8/2011 | Hinckley et al. | |
| 2011/0209104 A1 | 8/2011 | Hinckley et al. | |
| 2011/0210932 A1 | 9/2011 | Ryu et al. | |
| 2011/0252357 A1 | 10/2011 | Chaudhri | |
| 2011/0256848 A1 | 10/2011 | Bok et al. | |
| 2011/0260829 A1 | 10/2011 | Lee | |
| 2011/0265002 A1* | 10/2011 | Hong et al. | 715/702 |
| 2011/0265036 A1 | 10/2011 | Hoehne | |
| 2011/0296333 A1 | 12/2011 | Bateman et al. | |
| 2011/0296334 A1* | 12/2011 | Ryu et al. | 715/776 |
| 2011/0296351 A1 | 12/2011 | Ewing, Jr. et al. | |
| 2011/0307778 A1 | 12/2011 | Tsai et al. | |
| 2012/0007854 A1 | 1/2012 | Cho | |
| 2012/0026118 A1* | 2/2012 | Hackborn | G06F 3/03547 345/173 |
| 2012/0030625 A1 | 2/2012 | Miyazaki | |
| 2012/0054663 A1 | 3/2012 | Baek et al. | |
| 2012/0081399 A1 | 4/2012 | Sirpal et al. | |
| 2012/0083260 A1 | 4/2012 | Arriola et al. | |
| 2012/0084647 A1 | 4/2012 | Homma et al. | |
| 2012/0089938 A1 | 4/2012 | Homma et al. | |
| 2012/0096395 A1 | 4/2012 | Ording et al. | |
| 2012/0102425 A1 | 4/2012 | Song | |
| 2012/0124505 A1* | 5/2012 | St. Jacques, Jr. | 715/776 |
| 2012/0127109 A1 | 5/2012 | Nishio et al. | |
| 2012/0130764 A1 | 5/2012 | Harthcryde et al. | |
| 2012/0131496 A1 | 5/2012 | Goossens et al. | |
| 2012/0166975 A1 | 6/2012 | Oh et al. | |
| 2012/0167017 A1 | 6/2012 | Oh | |
| 2012/0174042 A1 | 7/2012 | Chang | |
| 2012/0210270 A1 | 8/2012 | Kwon et al. | |
| 2012/0242584 A1* | 9/2012 | Tuli | G06F 3/016 345/173 |
| 2012/0246596 A1 | 9/2012 | Ording et al. | |
| 2012/0297335 A1 | 11/2012 | Ramasubramanian et al. | |
| 2012/0306772 A1* | 12/2012 | Tan | G06F 3/0488 345/173 |
| 2012/0311438 A1* | 12/2012 | Cranfill et al. | 715/256 |
| 2013/0047125 A1 | 2/2013 | Kangas et al. | |
| 2013/0095464 A1 | 4/2013 | Ediger et al. | |
| 2013/0097556 A1 | 4/2013 | Louch | |
| 2013/0111395 A1 | 5/2013 | Ying et al. | |
| 2013/0117698 A1 | 5/2013 | Park et al. | |
| 2013/0132906 A1 | 5/2013 | Siurumaa et al. | |
| 2013/0201113 A1 | 8/2013 | Hinckley et al. | |
| 2013/0232409 A1 | 9/2013 | Cranfill et al. | |
| 2013/0239063 A1* | 9/2013 | Ubillos et al. | 715/838 |
| 2013/0298069 A1 | 11/2013 | Petschnigg et al. | |
| 2014/0123081 A1 | 5/2014 | Park et al. | |
| 2014/0165006 A1 | 6/2014 | Chaudhri et al. | |
| 2014/0229911 A1 | 8/2014 | Inamoto | |
| 2015/0026630 A1 | 1/2015 | Bullock | |

FOREIGN PATENT DOCUMENTS

| | | |
|---|---|---|
| JP | 2011-022811 A | 2/2011 |
| WO | WO-2011/007401 A1 | 1/2011 |

OTHER PUBLICATIONS

"Multi-Touch Gestures," From the Wikipedia, the free encyclopedia, Aug. 30, 2011, <http://en.wikipedia.org/wiki/Multi-touch_gestures>.

(56) References Cited

OTHER PUBLICATIONS

"Quick Start Guide," retrieved from <http://perfectbrowser.com/quickstart_ipad.html>, Oct. 5, 2011.
Anonymous, iPod touch Benutzerhandbuch (with iPhone 2.1 Software), Sep. 9, 2008, retrieved from http://manuals.info.apple.com/de_DE/iPod_touch_2.1_Benutzerhandbuch.pdf.
Japanese Office Action mailed Jan. 10, 2017, which issued in Japanese Application No. 2015-531072.
Jam House Inc., "Hitome-de-wakaru Windows 7, Home edition," (Windows 7 at a glance, Home edition, Nikkei Business Publications, Inc., Oct. 26, 2009, $1^{st}$ edition, p. 6 and 28.
Bamboo User's Guide, Wacom Co., Ltd., 2011, Version 1.0, Rev. G1511, p. 24.
Tatsuro Hokugo, "Three-dimensino, Animation, Clarity makes an operatino of an equipment gorgeous," Nikkei Electronics, Nikkei Business Publications, Inc., Mar. 26, 2007, vol. 948, p. 61-69.

* cited by examiner

TAB SCRUBBING USING NAVIGATION GESTURES

CROSS-REFERENCES TO RELATED APPLICATIONS

The present application claims the benefit of U.S. Provisional Patent Application Ser. No. 61/698,515, entitled "Stackable Workspaces on an Electronic Device," filed on Sep. 7, 2012, which is hereby incorporated by reference in its entirety for all purposes.

BACKGROUND

This present disclosure relates to user interfaces, in particular, to tab switching on user interfaces.

DESCRIPTION OF THE RELATED ART

Some browsers may provide tabs for multiple web pages, associated with multiple universal resource locators (URLs), that a user browsing the web has requested. For example, a user may navigate to a first URL, the results of which are displayed on a first tab of the browser, a second URL, the results of which are displayed on a second tab of the browser, and so on for each new URL invoked. More and more users often have multiple tabs (e.g., more than ten tabs) open for various web pages the user is interested in browsing. Users may switch back and forth between tabs as they continue their browsing activities. Tab switching is often referred to as "tab scrubbing".

In some browsers, users may switch between tabs by, for example, moving the mouse cursor to the top of the screen where the tabs are located, choosing a tab by clicking on one of the tabs (which brings up the web page associated with the selected tab), and then moving the mouse back down over the newly displayed page and scrolling to browse the contents of that web page. In other cases, tabs may be switched by repeatedly swiping to traverse to a next tab. For example, a first swipe gesture to the right may bring up the next tab to the right of the current tab, a subsequent swipe gesture to the right may bring up the next tab from that tab, and so on. As such, tab scrubbing may take multiple user gestures in order to select a desired tab. More seamless or user friendly tab switching mechanisms may enhance user experience.

SUMMARY

In one aspect, the disclosed subject matter relates to a method for tab switching. The method includes a step for receiving a multi-finger swipe gesture event for a computing device in a direction corresponding to a list of tabs of a user interface displayed on a screen of the computing device. The method also includes a step for determining a distance of movement corresponding to the received multi-finger swipe gesture. The method also includes a step for determining a next tab for selection from the list of tabs, wherein a distance from a current tab to the next tab is proportional to the determined distance of movement. The method also includes a step for providing instructions for a graphical update of the user interface, wherein the graphical update displays contents of a user interface associated with the determined next tab. Other aspects can include corresponding systems, apparatus and computer program products.

The In some aspects, the disclosed subject matter relates to a computer-readable medium encoded with executable instructions for tab scrubbing. The instructions include code for receiving a multi-finger swipe gesture event for a computing device in a direction corresponding to a list of tabs of a user interface displayed on a screen of the computing device. The instructions also include code for determining a distance of movement corresponding to the received multi-finger swipe gesture. The instructions also include code for determining a next tab from the list of tabs, wherein a distance from a current tab to the next tab is proportional to the determined distance of movement. The instructions also include code for providing instructions for a graphical update of the user interface, wherein the graphical update highlights the determined next tab.

In some aspects, the disclosed subject matter relates to a system. The system includes one or more processors and a memory. The memory includes instructions for tab switching that when executed by the one or more processors cause the one or more processors to receive a multi-finger swipe gesture event for a computing device in a direction corresponding to a list of tabs of a user interface displayed on a screen of the computing device. The instructions also cause the one or more processors to determine a distance of movement corresponding to the received multi-finger swipe gesture. The instructions also cause the one or more processors to determine a next tab from the list of tabs, wherein a distance from a current tab to the next tab is proportional to the determined distance of movement. The instructions also cause the one or more processors to receive an end of swipe gesture event indicative of selection of the determined next tab. The instructions also cause the one or more processors to provide instructions for a graphical update of the user interface, wherein the graphical update displays contents of a user interface associated with the next tab.

The details of one or more implementations are set forth in the accompanying drawings and the description below. Other features and advantages will be apparent from the description and drawings, and from the claims.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

According to various aspects of the subject technology, an intuitive user interface for organizing and displaying different workspaces on an electronic device is provided. A workspace comprises an area in which one or more applications can be displayed to a user of the electronic device. A workspace may allow the user to view and/or interact with one or more applications opened in that workspace. According to various aspects of the subject technology, a plurality of workspaces may be stacked on top of one another so that the user may be able to easily keep track of and/or use an application opened in a particular workspace.

According to some aspects of the subject technology, techniques for tab scrubbing that enables a user to switch back and forth between tabs in an application (e.g., a browser application) using a single swipe gesture are provided. For example, a user of a touch device may swipe three fingers across a webpage displayed on a touch screen, in a direction along a list of tabs displayed for a web browser displaying the webpage, to initiate a tab scrubbing event. Upon the cessation of the swipe gesture (e.g., by either stopping the motion for a threshold amount of time or by lifting the three fingers off the touch screen), a next tab associated with the position at which the swipe gesture is stopped is selected as the current tab to display, thereby updating the contents displayed to a webpage associated with the next tab.

Figure 1:
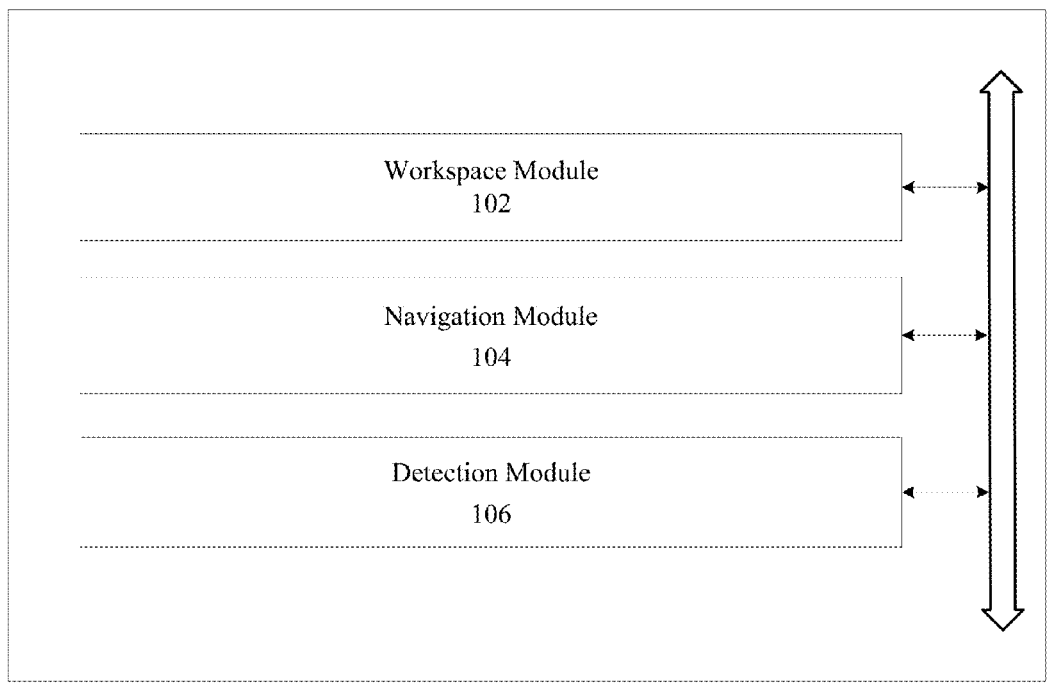
FIG. 1 illustrates an example of a system for providing stackable workspaces on an electronic device, in accordance with various aspects of the subject technology.

FIG. 1 illustrates an example of system 100 for providing stackable workspaces on an electronic device, in accordance with various aspects of the subject technology. System 100 comprises workspace module 102, navigation module 104, and detection module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure. System 100, for example, may be part of the electronic device. The electronic device may be a desktop computer, a laptop computer, a netbook computer, a tablet, a mobile phone, a personal digital assistant, and/or other suitable device.

Figure 2:
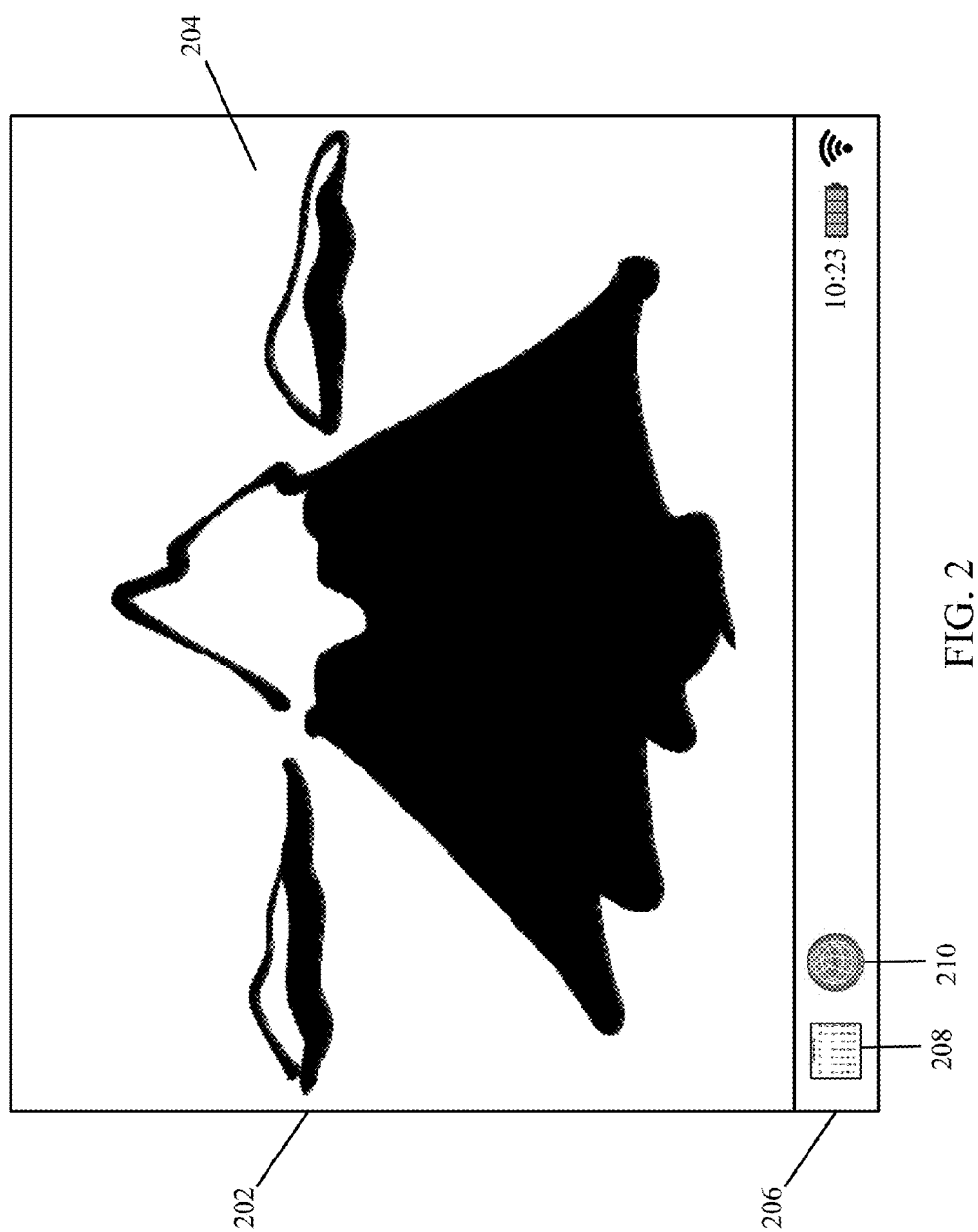
FIG. 2 illustrates an example of a desktop workspace displayed on a screen of the electronic device, in accordance with various aspects of the subject technology.

FIG. 2 illustrates an example of desktop workspace 202 displayed on a screen of the electronic device, in accordance with various aspects of the subject technology. When an operating system of the electronic device boots up, for example, navigation module 104 may display desktop workspace 202 to a user of the electronic device first. As shown, desktop workspace 202 comprises desktop wallpaper 204. Navigation module 104 also displays navigation menu 206, which comprises access points 208 and 210 (e.g., icons, links, shortcuts, bookmarks, etc.). Access point 208, for example, is a shortcut that provides access to a calendar application. Access point 210, for example, is a shortcut that provides access to a web browser application. These applications can be opened in different ways using access points 208 and 210, either in desktop workspace 202 or in new workspaces stacked on desktop workspace 202. Although only the calendar application and the web browser application are described, the subject technology is applicable to other applications such as productivity applications and multimedia applications.

Figure 3:
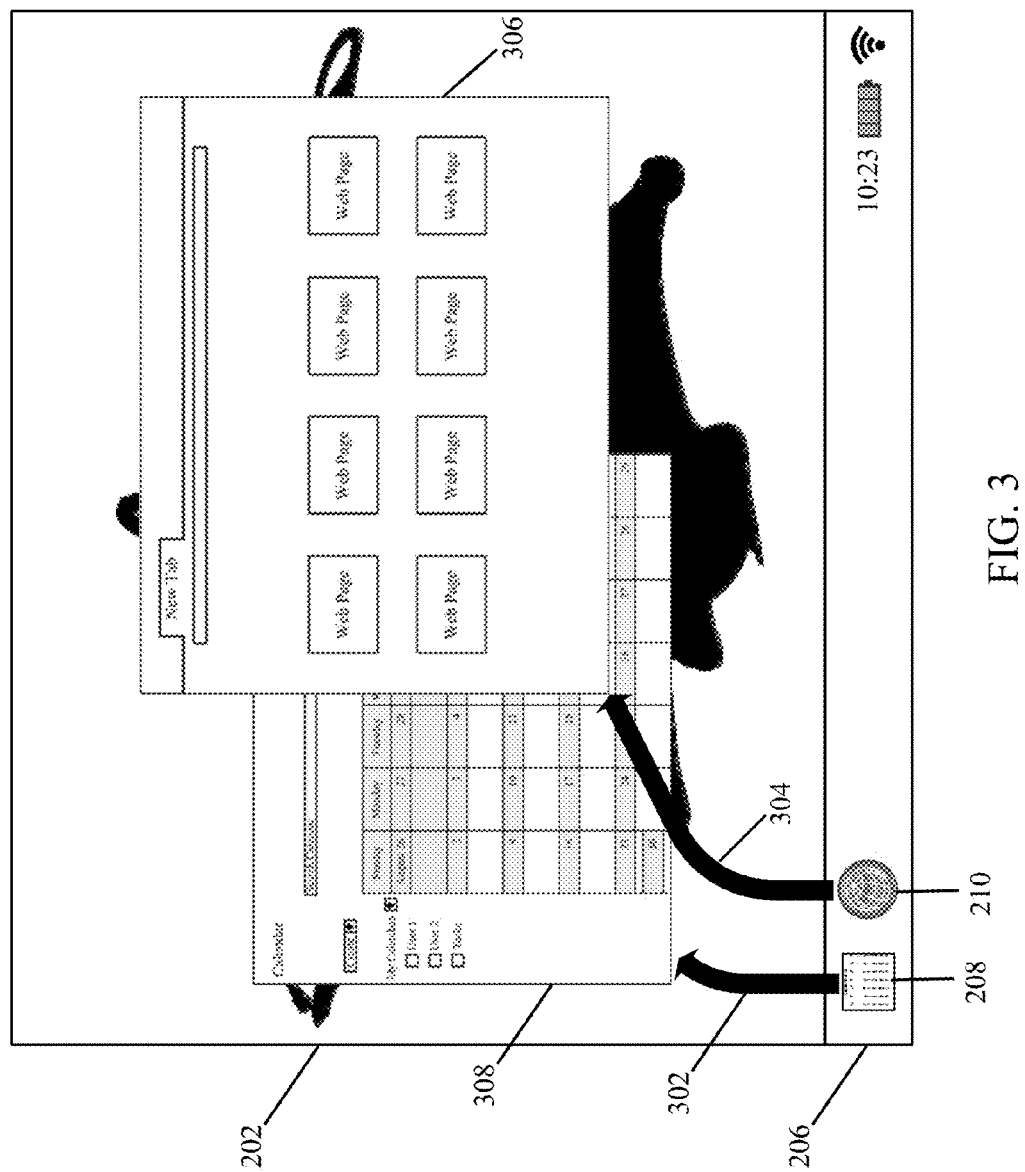
FIG. 3 illustrates an example of opening a calendar application and a web browser application in a desktop workspace using access points, in accordance with various aspects of the subject technology.

FIG. 3 illustrates an example of opening the calendar application and the web browser application in desktop workspace 202 using access points 208 and 210, in accordance with various aspects of the subject technology. According to certain aspects, the user may perform a swipe gesture on access point 208 (e.g., along path 302) and a swipe gesture on access point 210 (e.g., along path 304) to open the respective applications. Detection module 106 may detect these swipe gestures, and in response to such a detection, workspace module 102 may open the respective applications at the respective ends of the swipe gestures. For example, as shown in FIG. 3, the calendar application is opened in window 308, while the web browser application is opened in window 306. These windows are displayed within desktop workspace 202, and have sizes that are less than a maximized size of desktop workspace 202. The maximized size of a workspace, such as desktop workspace 202, may be substantially equal to a size of the screen of the electronic device. In some aspects, this maximized size may be at least 95%, 90%, or 80% of the size of the screen of the electronic device. Still, in other aspects, this maximized size may be a lower percentage of the size of the screen of the electronic device depending on whether other objects (e.g., navigation menu 206) are displayed at the same time.

Figure 4:
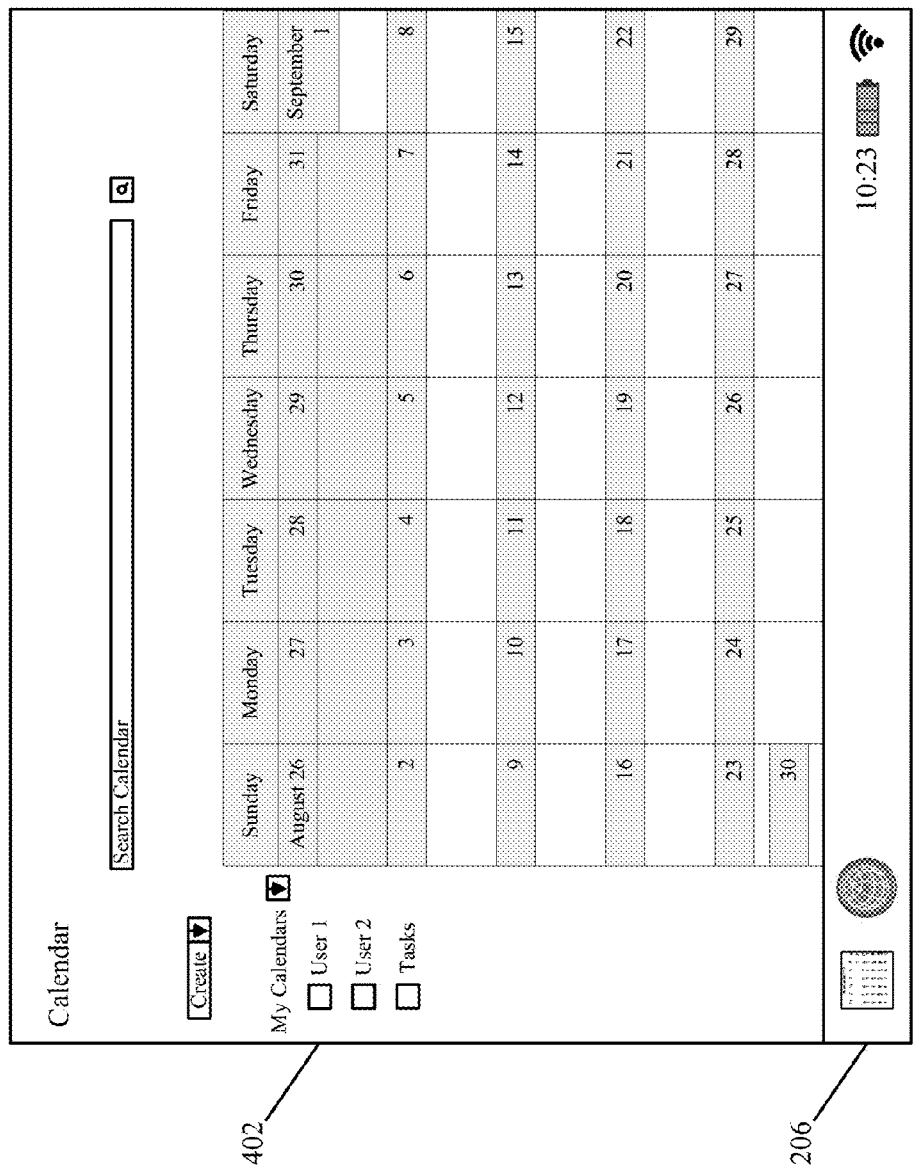
FIG. 4 illustrates an example of a workspace in which a calendar application is opened, in accordance with various aspects of the subject technology.
Figure 5:
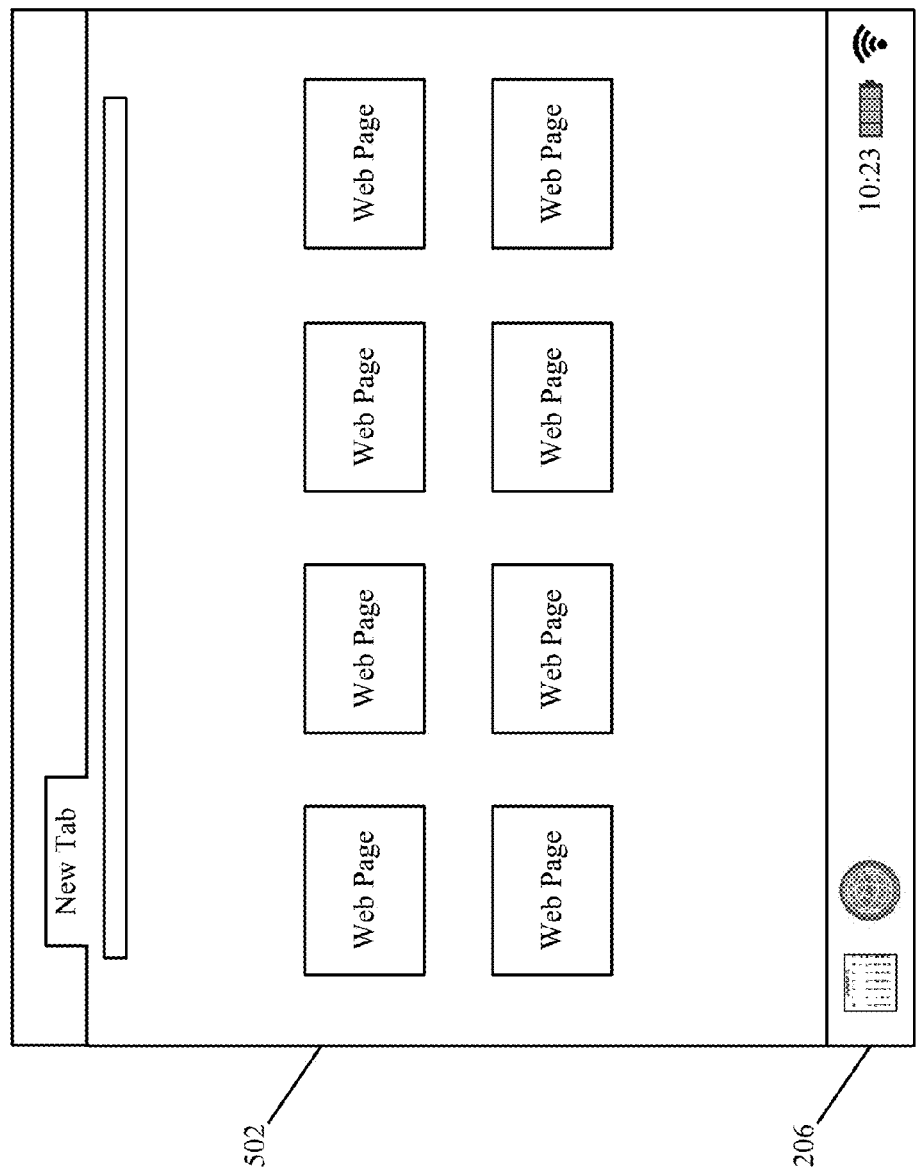
FIG. 5 illustrates an example of a workspace in which a web browser application is opened, in accordance with various aspects of the subject technology.

While the calendar application and the web browser application are displayed in FIG. 3 in sizes that are less than a maximized size of desktop workspace 202, these applications may also be opened in different workspaces such that each application may be maximized in a respective workspace. FIG. 4 illustrates an example of calendar workspace 402 in which the calendar application is opened, in accordance with various aspects of the subject technology. FIG. 5 illustrates an example of web browser workspace 502 in which the web browser application is opened, in accordance with various aspects of the subject technology. As shown in these figures, each application is maximized in its respective workspace. According to certain aspects, the applications can be maximized in this manner in several different ways. For example, referring back to FIG. 3, the user may be allowed to select an option to maximize either window 308 or window 306. Doing so will allow the respective application to be opened in a new workspace. As another example, the user may perform a tap gesture on access points 208 and 210, which may automatically open and/or maximize the respective application in a new workspace.

The user may also be allowed to open a contextual menu with respect to access points 208 and 210 (e.g., by right clicking on these access points) in order to reveal an option to open and/or maximize the respective application in a new workspace.

Figure 6:
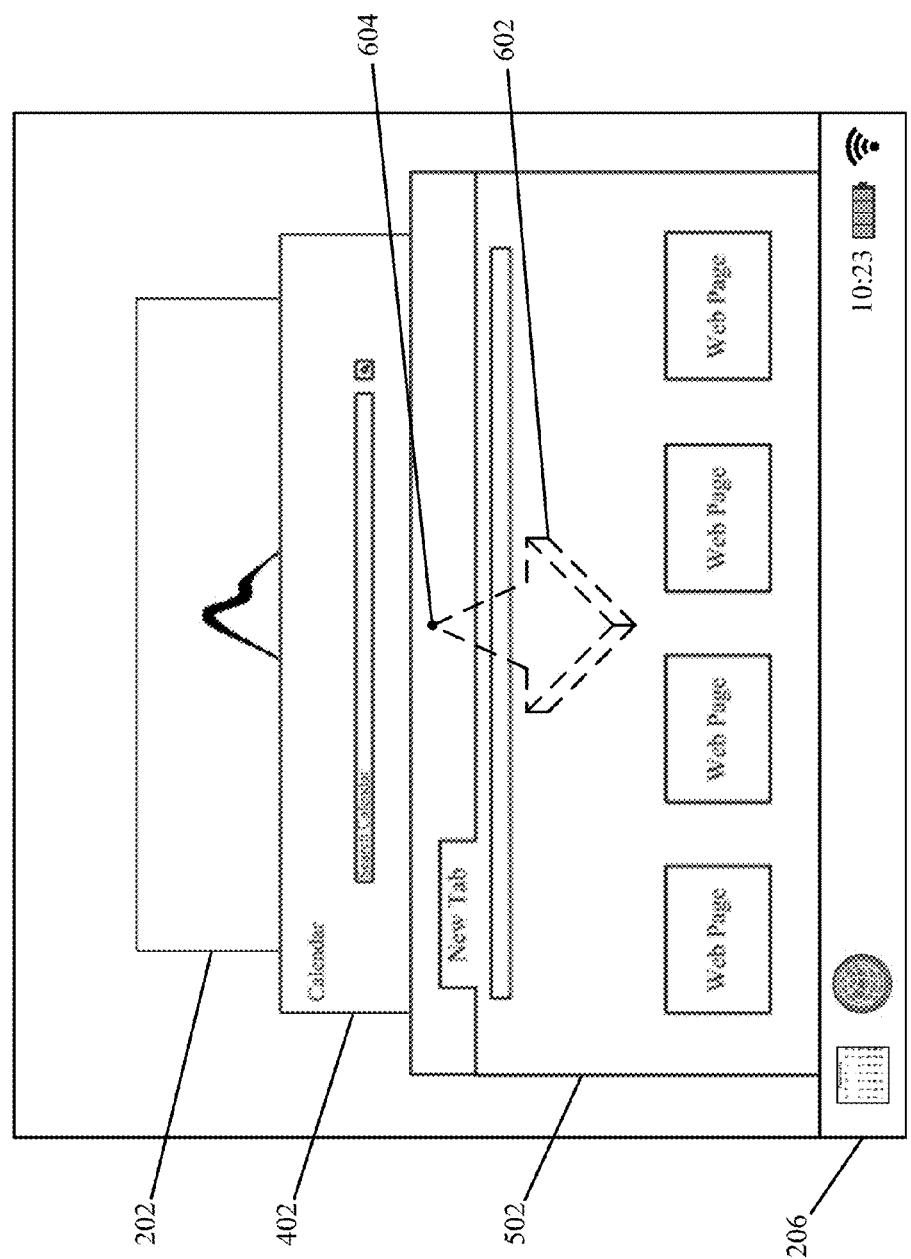
FIG. 6 illustrates an example of an overview of workspaces stacked on top of one another along a stacking axis, in accordance with various aspects of the subject technology.

According to various aspects of the subject technology, workspace module 102 may generate workspaces and open applications in the workspaces. As discussed above, these workspaces may be stacked on top of one another in order to allow the user to easily navigate between different workspaces. FIG. 6 illustrates an example of an overview of workspaces 202, 402, and 502 stacked on top of one another along stacking axis 602, in accordance with various aspects of the subject technology. Stacking axis 602 is shown as an arrow proceeding in a direction out of the page from vanishing point 604. Stacking axis 602 is illustrated using dotted lines to indicate that it is not a part of the content of workspaces 202, 402, and 502. As shown in FIG. 6, web browser workspace 502 is stacked on calendar workspace 402, which is stacked on desktop workspace 202. Stacking workspaces in this manner may allow the user to visualize where the workspaces are relative to one another, thereby allowing the user to easily navigate between workspaces.

For example, a user currently viewing desktop workspace 202 (e.g., FIG. 2) wishes to navigate to calendar workspace 402 (e.g., FIG. 4). This transition from desktop workspace 202 to calendar workspace 402 may be displayed as an animation, thereby making it easy for the user to visualize the positions of the workspaces relative to one another. According to certain aspects, navigation module 104 may display this animation as a traversal of the stack of workspaces from desktop workspace 202 to calendar workspace 402. Navigation module 104, for example, may display this traversal according to two approaches.

According to a first approach, navigation module 104 may display the traversal of the stack in a manner that focuses on the maximized sizes of the workspaces during the traversal. For example, navigation module 104 may shrink desktop workspace 202 from its maximized size (e.g., as shown in FIG. 2) to an overview size, which is less than the maximized size of desktop workspace 202. Shrinking desktop workspace 202 in this manner may give the user the appearance that desktop workspace 202 is moving away from the user. Navigation module 104 may also fade in calendar workspace 402 during the shrinking of desktop workspace 202. Furthermore, navigation module 104 may shrink calendar workspace 402 from a supermaximized size to its maximized size (e.g., as shown in FIG. 4) during the fading in of calendar workspace 402. The supermaximized size of calendar workspace 402 is greater than the maximized size of calendar workspace 402 (e.g., greater than a size of the screen of the electronic device). Shrinking and fading in calendar workspace 402 in this manner may give the user the appearance that calendar workspace 402 is moving from behind the user to directly in front of the user.

Figure 7:
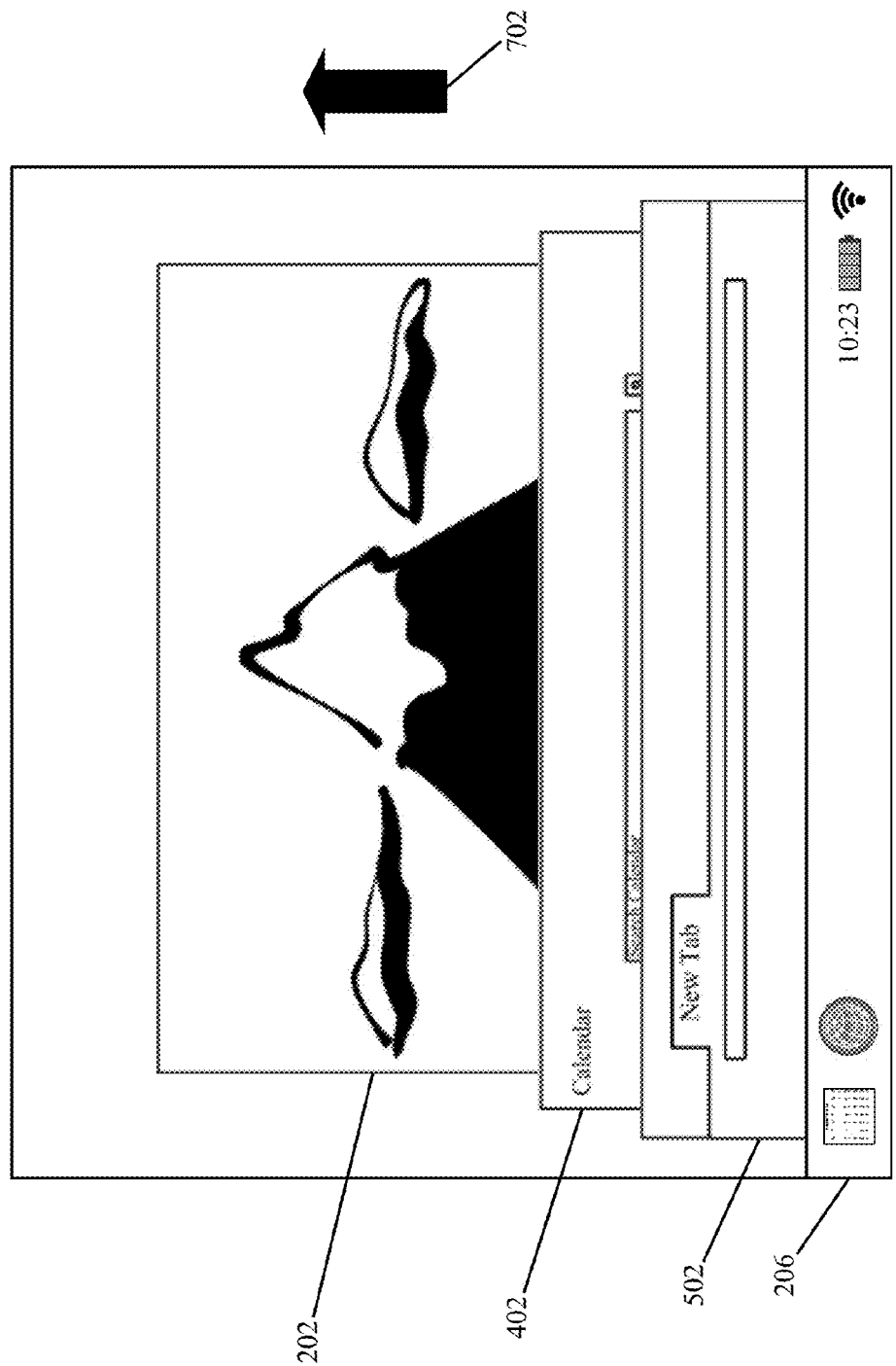
FIG. 7 illustrates an example of an overview of workspaces stacked on top of one another along a stacking axis, in accordance with various aspects of the subject technology.
Figure 8:
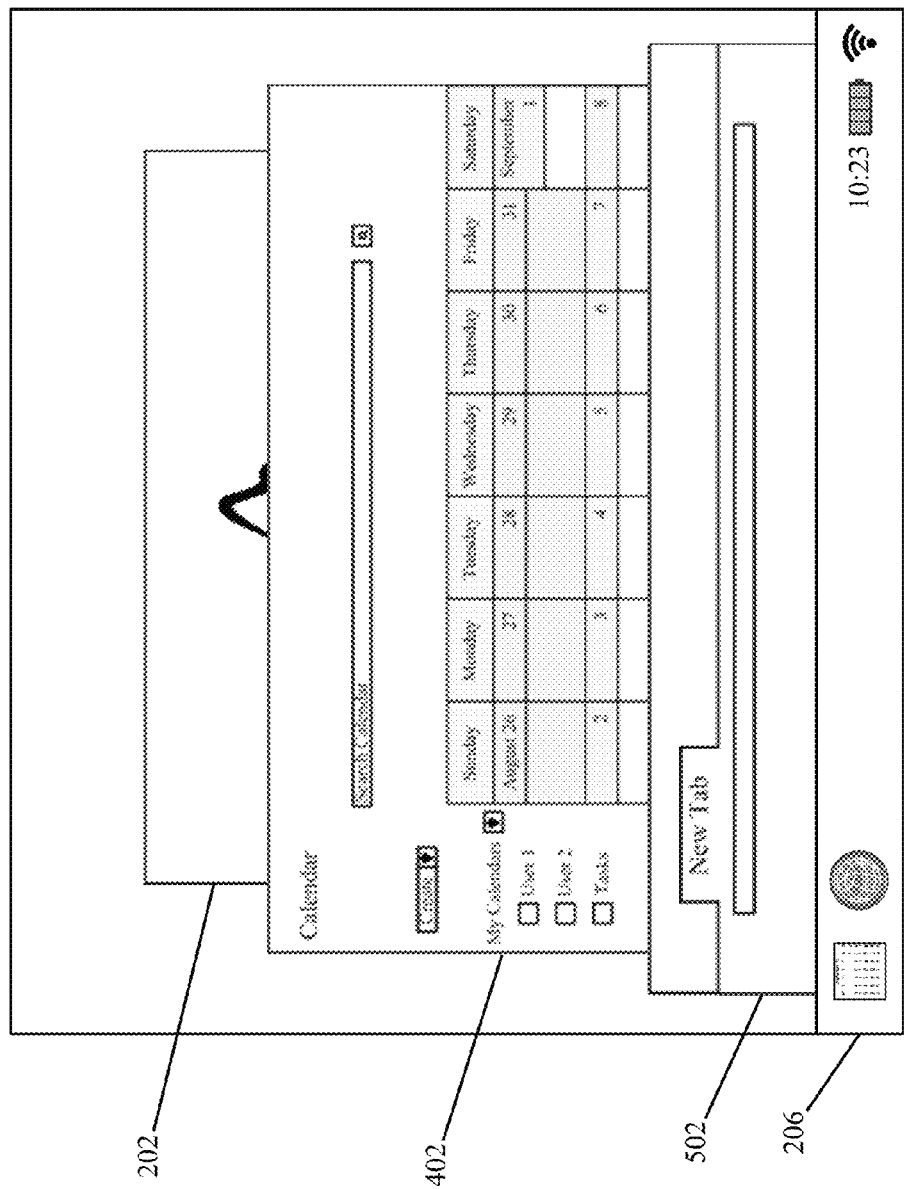
FIG. 8 illustrates an example of an overview of workspaces stacked on top of one another along a stacking axis, in accordance with various aspects of the subject technology.

According to a second approach, navigation module 104 may display the traversal of the stack from an overview perspective of the stack. For example, navigation module 104 may display an overview of the stack (e.g., as shown in FIG. 6). According to certain aspects, since the user is currently viewing desktop workspace 202, navigation module 104 may display the overview of the stack by displaying more of desktop workspace 202 than calendar workspace 402 (e.g., as shown in FIG. 7). Navigation module 104 may continue displaying the traversal of the stack by revealing more of calendar workspace 402 than desktop workspace 202 (e.g., as shown in FIG. 8.). For example, navigation module 104 may reveal more of calendar workspace 402 by shrinking desktop workspace 202 and/or covering desktop workspace 202 with calendar workspace 402. Navigation module 104 may also expand calendar workspace 402 to its maximized size in order to complete the traversal of the stack.

According to various aspects of the subject technology, the user may trigger navigation between different workspaces using a variety of techniques. For example, if the user is using a mouse, the user may navigate from desktop workspace 202 to calendar workspace 402 by moving the mouse away from the user or spinning the scroll wheel of the mouse forward from the user (e.g., thus providing the user with the appearance of physically sliding calendar workspace 402 onto desktop workspace 202). If the user is using a keyboard, the user may navigate from desktop workspace 202 to calendar workspace 402 by pressing the arrow key that is pointing up (e.g., thus providing the user with the appearance of physically sliding calendar workspace 402 onto desktop workspace 202). According to certain aspects, navigation module 104 may display navigation menu 206 when any of the stack of workspaces are displayed. Thus, the user may be allowed to click, tap, select, or perform some other suitable gesture on access point 208 to navigate to calendar workspace 402. In some aspects, the user may perform swipe gestures to navigate from desktop workspace 202 to calendar workspace 402. For example, referring to FIG. 7, the user may perform the swipe gesture along direction 702 (e.g., toward a top of desktop workspace 202) to navigate from desktop workspace 202 to calendar workspace 402, thereby allowing the user to view calendar workspace 402 as illustrated in FIG. 8. This swipe gesture may provide the user with the appearance of physically sliding calendar workspace 402 onto desktop workspace 202. According to certain aspects, this swipe gesture may be at least a two-finger swipe gesture. In one example, such a swipe gesture is a three-finger swipe gesture.

Although the subject technology has been described with respect to navigating from an earlier workspace that is generated (e.g., desktop workspace 202) to a later workspace that is generated (e.g., calendar workspace 402), navigation in the reverse direction is also possible. In such a case, opposite effects (e.g., expanding instead of shrinking, moving the mouse toward the user instead of away, spinning the scroll wheel backwards toward the user instead of forwards, pressing the arrow key that is pointing down instead of up, performing a swipe gesture toward the bottom of a workspace instead of the top, etc.) would be applicable.

Furthermore, although inter-workspace swipe gestures have been described (e.g., swipe gestures that allow the user to navigate from one workspace to another), aspects of the subject technology also include intra-workspace swipe gestures (e.g., swipe gestures that allow the user to switch between features or applications opened in a particular workspace).

Figure 9:
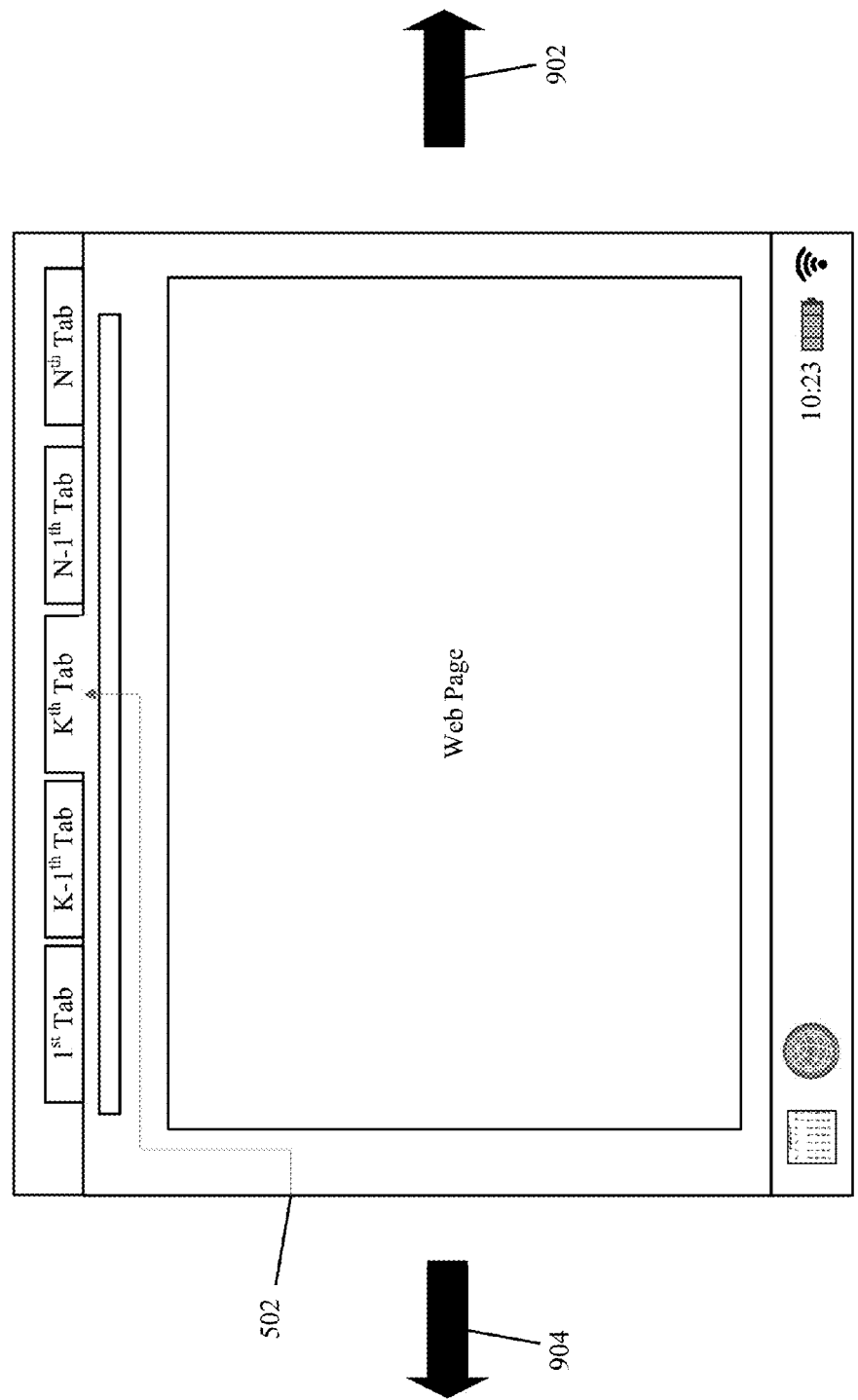
FIG. 9 illustrates an example of a workspace in which a web browser application is opened, in accordance with various aspects of the subject technology.

FIG. 9 illustrates a web browser workspace 502 when the web browser application has multiple tabs opened (e.g., 1st Tab . . . K–1th Tab, Kth Tab . . . N–1th Tab, and Nth tab). A swipe gesture along direction 902 (e.g., toward one side of web browser workspace 502) may allow the user to switch from a current tab displayed (e.g., Kth Tab) to a next tab to be displayed (e.g., . . . N–2th tab, N–1th Tab, or Nth Tab). A swipe gesture along direction 904 (e.g., toward the other side of web browser workspace 502) may allow the user to switch from the current tab displayed (e.g., Kth Tab) to the next tab to be displayed (e.g., K–1$^{th}$ Tab, K–2th tab . . . 1st Tab).

These intra-workspace swipe gestures may also be at least two-finger swipe gestures (e.g., a three-finger swipe gesture). The intra-workspace swipe gestures may allow the user to switch between different features of an application, including windows, frames, tabs, buttons, access points, and/or other suitable objects of an application that the use can interact with. A swipe gesture may be a short quick gesture on a computing device or may be of a longer duration. For example, a user may swipe three fingers from one side of the device towards an opposite side, pause, and continue again with the swipe gesture. A swipe gesture may be of varying speed, length, duration, etc. A swipe gesture may be repeated.

Although, in some aspects tab switching is described in this disclosure with respect to workspaces, the subject technology for tab switching may be employed in any user interfaces or applications, such as a web browser, having multiple tabs and does not require workspaces.

In some aspects, tab scrubbing using navigational gestures is provided. In one aspect, systems and methods are provided that enable a user to swipe using a single gesture (e.g., using two or three fingers on a touch device or the mouse by a right-click and drag motion or on a trackpad with swiping multiple fingers across the surface of the trackpad), in a direction corresponding to a list of displayed tabs in an application, to switch between tabs. In some cases, the swiping action may be performed over the actual displayed tabs. The selected tab may then be the tab over which the swiping motion ends. In another aspect, the swiping gesture may be somewhere else on the screen (e.g., a horizontal swipe motion below the displayed tabs). The selected tab in such a case may be a tab corresponding and proportional to the distance of movement of the swipe gesture. A tab may be considered to be selected upon the cessation of the swipe gesture (e.g., by either stopping the motion for a threshold amount of time or by lifting the three fingers off the touch screen). Upon the swipe gesture ending, the contents of the tab associated with the stopping of the swipe gesture is selected as the tab to display currently.

As the swiping gesture progresses, an associated tab may be highlighted without actually switching the contents of the screen display to the contents associated with the tab (e.g., to save on resources on low-resource devices such as a smartphones), or the tab may be highlighted and the contents associated (e.g., a web page) with the tab may actually be displayed as tabs get highlighted corresponding to the gesture motion.

As the single swipe gesture is taking place, a graphical indication of a next tab may be provided to the user, so the user has feedback as to what tab the swipe gesture is currently associated with. For example, as a user swipes to the right, tabs may be highlighted to the right corresponding to the amount of movement to the right. Providing a graphical indication of a next tab has the advantage of giving the user a visual indication of which tab will be selected upon user stopping the swipe gesture in progress.

During the swipe gesture, the determination of which tab to show as the next tab may be based on the amount of movement or distance of the swipe gesture on the screen or the speed of the gesture. A faster speed may lead to the selection of a further tab from the starting point of the gesture than a slower speed, for the same amount of distance moved. The tab selection may be based on a combination of the amount of distance of the swipe gesture, the speed or acceleration of the gesture, and the tab size. Additionally, a threshold movement may be required for triggering the start of a "tab scrub" event, so as not to register inadvertent movement as an actual tab scrub event.

When a swipe gesture reaches the end of a screen area (either on the left or right of the screen display), the next tab reached at that point may become the selected tab. In some aspects, a subsequent swipe gesture in the same direction as the previous swipe gesture may start from the selected tab. In some aspects, if all of the tabs have been shuffled through in a particular direction (either left or right), then additional movement or a subsequent swipe gesture in the respective direction may not cause any next tab to be selected because all of the tabs in that direction have already been shuffled through.

In some aspects, tab scrubbing may be implemented using a pointing device (e.g., a mouse device), where a combination of keys (e.g., right click on the mouse) and a horizontal drag motion to the right or to the left is equivalent to the three fingers swipe gesture for tab scrubbing described above. In other aspects, a mouse-wheel movement, along with for example a right-click of the mouse, may also register the start of a "tab scrubbing" event as described above for the three fingers gesture.

In some aspects, an initial direction of a gesture may lock-in the type of event to be triggered. For example, an initial movement in the horizontal direction (where the user interface displays a list of tabs in a horizontal direction) may lock-in a "tab scrubbing" event, while an initial movement in the vertical direction may lock-in a different event, e.g., "change workspace" event. In other aspects, where two fingers are used with a horizontal swipe gesture to initiate a "tab scrubbing" event, then an initial movement in the horizontal direction (where the user interface displays a list of tabs in a horizontal direction) may lock-in a "tab scrubbing" event, while an initial movement in the vertical direction may lock-in a different event, e.g., "scroll" event. The locking-in of an event based on an initial movement is to avoid confusion as to what event a user is interested in upon inadvertent movement that is not corresponding to either a horizontal or vertical movement, e.g., diagonal movement.

Figure 10:
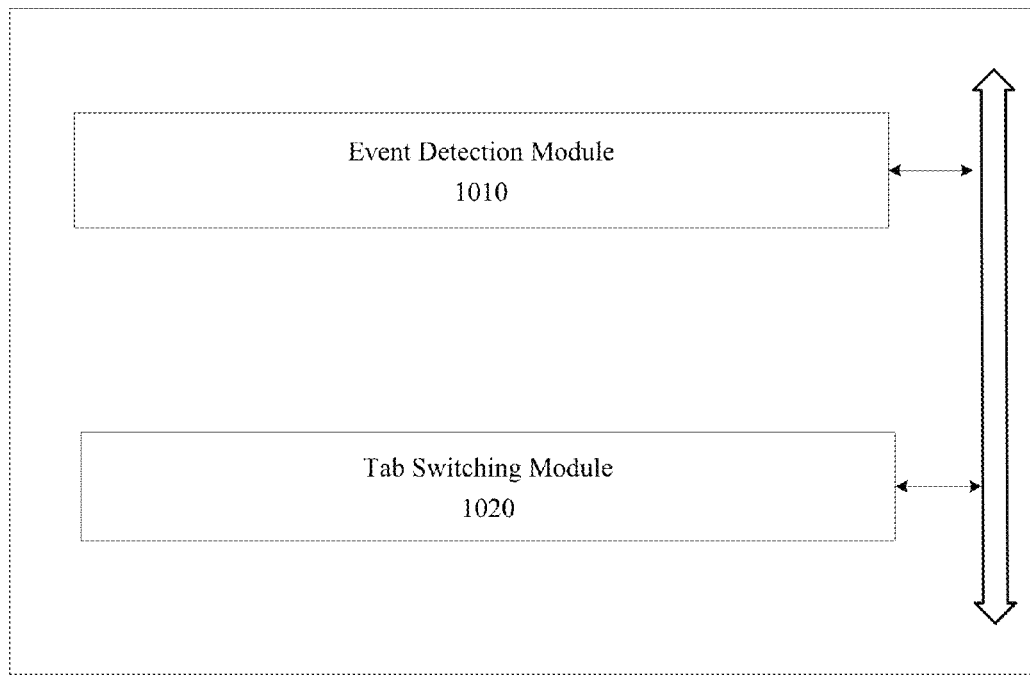
FIG. 10 illustrates an example of a system for tab switching on an electronic device, in accordance with various aspects of the subject technology.

FIG. 10 illustrates an example of system 1000 for tab switching on an electronic device, in accordance with various aspects of the subject technology. System 1000 comprises event detection module 1010 and tab switching module 1020. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure. System 1000, for example, may be part of the electronic device. The electronic device may be a desktop computer, a laptop computer, a netbook computer, a tablet, a mobile phone, a personal digital assistant, and/or other suitable device.

Event detection module 1010 may be configured to receive user input events from an electronic device on which system 1000 is implemented. Event detection module 1010 receives, for example, touch or pointing device input events as described for tab switching above (e.g., three finger swipe gestures on a touch device, pointing device button actions and device movements for an electronic device, etc.). Event detection module 1010 is configured to determine if the input event corresponds to a tab switching event (e.g., three finger swipe or mouse event with some combination of keys pressed or multi-finger swipe on a trackpad/touchpad indicating a tab scrubbing event). Event detection module 1010 is also configured to take information received from a respective input event and forward the information to tab switching module 1020 where the event is determined to be a tab switching event.

Tab switching module 1020 is configured to receive information about a tab switching event from event detection module 1010. Tab switching module 1020 is also configured to take the information for a tab switching event and provide corresponding user interface updates to the electronic device from which the tab switching event input is received. In some aspects, tab switching module 1020 takes the information received with a tab switching event and calculates a distance of the swipe gesture, or a speed of the swipe gesture, or an acceleration of the swipe gesture. The tab switching module 1020 is configured to determine a next tab (e.g., the tab that is associated with a current position of the swipe gesture) based on the calculated distance, speed, or acceleration of the swipe gesture or based on some combination of the three values. The tab switching module 1020 is also configured to provide updates to the user interface to update the user interface with either the contents associated with the determined next tab or a highlight of the determined next tab.

In some aspects, tab switching module 1020 may receive (e.g., as received by event detection module 1010) multiple data points as a swipe gesture progresses. Tab switching module 1020 may take the data points, as received, and calculate a distance for each new data point received and determine if the distance moved results in a new next tab for tab selection. If a new next tab is determined, then tab switching module 1020 may provide updates to the user interface to update the user interface with the contents associated with the determined new next tab. In other aspects, tab switching module 1020 may provide a lighter update upon the determination of a new next tab and provide only an updating, highlighting the determined new next tab (as opposed to updating the contents of the user interface associated with the tab).

The lighter update of highlighting the next tab as a swipe gesture progresses may have the advantage of conserving resources on a resource-constrained device. In such cases, where only a highlight of a newly determined next tab is provided, the tab switching module 1020 may also be configured to receive an event indicative of the end of a swipe gesture. The indication may be a result, for example, of the user who is executing the swipe gesture lifting the three or two fingers off of the touch device or releasing the pointing device button(s) used to initiate the swipe gesture for tab scrubbing. Upon receiving of the end of the swipe gesture event, tab switching module 1020 updates the user interface with the contents associated with the determined next tab, corresponding to the distance traversed on the touch device, for example, before the user lifts the fingers off of the device. Tab switching module 1020 may communicate with other modules to update the user interface upon receiving touch input indicating a tab switching event.

Figure 11:
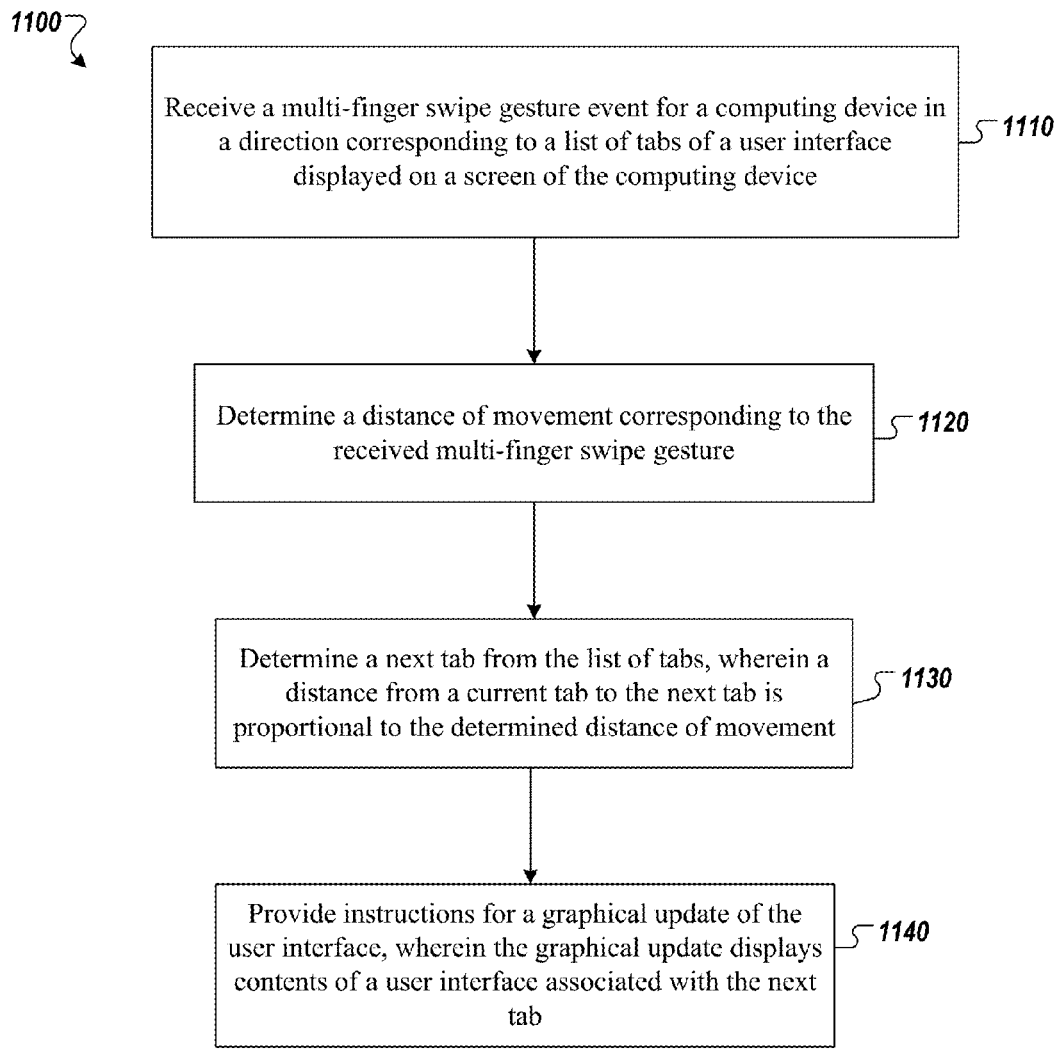
FIG. 11 illustrates an example process by which tab switching may be implemented.

FIG. 11 illustrates an example process by which tab switching may be implemented. At step 1110 of process 1100, a multi-finger swipe gesture event for a computing device in a direction corresponding to a list of tabs of a user interface displayed on a screen of the computing device is received. The multi-finger swipe gesture is a result of utilization of multiple fingers to execute the swipe gesture. For example, the multi-finger swipe gesture may be a result of a user of the computing device swiping two or three fingers across the screen or trackpad of the computing device in a direction corresponding to the displayed list of tabs. As another example, the swipe gesture may instead be a result of a user of the computing device right-clicking on a mouse device of the computing device and dragging the mouse device in a direction corresponding to the displayed list of tabs.

The direction corresponding to the displayed list of tabs may, for example, may be horizontal or vertical (e.g., sometimes on smartphones tab views or webpages are displayed in a vertical fashion while a traditional webpage displays tabs on the top in a horizontal direction).

The multi-finger swipe gesture may take place over the displayed tabs or anywhere else on the screen, trackpad, or pointing device surface. The swipe gesture may indicate a tab switching event, for example, because a two or a three finger swipe in a direction corresponding to a displayed list of tabs may be reserved for tab switching. Similarly, a right-mouse click with a drag motion in the direction of the displayed list of tabs may be reserved for tab switching. Two or three finger swipes, or right-clicking of mouse and dragging events are provided as examples. Other key combinations or swipe gestures may be used instead to indicate and reserve as a tab switching event.

A received swipe gesture, as in step 1110, may include information about a first position and a second position on the screen of the computing device. For example, the first position may correspond to a position at which the swipe gesture was initiated. The second position may correspond to the position at which the swipe gesture was halted. In some aspects, the swipe gesture may be halted and then the swipe gesture may continue once again. The received swipe gesture may also include data points along the entire path of the swipe gesture as it is taking place.

At step 1120, a distance of movement corresponding to the received multi-finger swipe gesture is determined. For example, the distance may be calculated based on information about the first and second position on the screen as received along with the swipe gesture. In the case where the swipe gestures includes a set of data points along the entire path of the swipe gesture, multiple distances may be calculated one for each new data point from the first position.

At step 1130, a next tab position from the list of tabs is determined, wherein a distance from a current tab to the determined next tab is proportional to the determined distance of movement. For example, the next tab position may be determined by selecting a tab corresponding proportionally to the distance of movement of the swipe gesture and the number of tabs available in the list of tabs from a currently displayed tab. For example, referring to FIG. 9, where the currently selected tab is the Kth tab, the distance moved in the 902 direction determines which tab (out of the Nth, N−1th, N−2th, etc. tabs) is to be the next tab position based on the determined distance and in proportion to the distance moved on the screen. The determination of the next tab may take into account a current tab, along with the determined distance of movement based on the multi-finger swipe gesture, e.g., the Kth tab discussed in the example above.

The determination of the next tab position may also take into account a speed or acceleration of the swipe gesture or a size of tabs in the list of tabs. For example, a faster speed or acceleration may lead to a further tab being determined as the next tab for a particular distance moved. A smaller size of the tabs (indicating more tabs in the list of tabs) may lead to a further tab being determined as the next tab for a particular distance moved.

At step 1140, instructions are provided for a graphical update of the user interface. In some aspects, the graphical update displays contents of a user interface associated with the next tab position. For example, where the currently displayed tab is the Kth tab of FIG. 9, a gesture in the 902 direction may lead to a distance corresponding to a N–7th tab. In such a case, a user interface (e.g., a webpage) associated with the N–7th tab would be displayed, making it the currently displayed tab. In other aspects, the graphical update provides a highlight of the determined next tab, without updating the contents of a user interface (e.g. a webpage) associated with the determined next tab.

Figure 12:
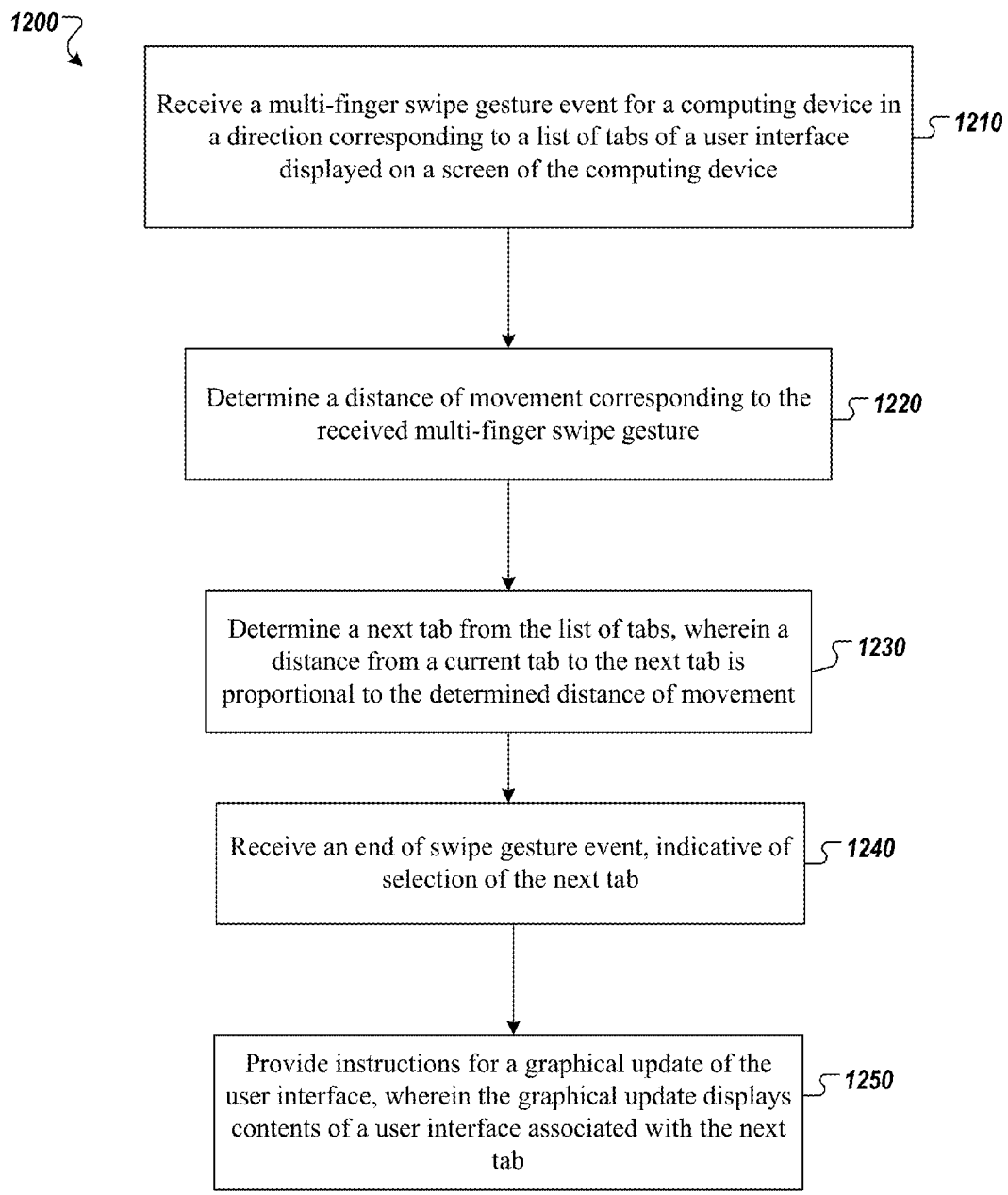
FIG. 12 illustrates an example process by which tab switching may be implemented.

FIG. 12 illustrates an example process by which tab switching may be implemented. At step 1210 of process 1200, a multi-finger swipe gesture event for a computing device in a direction corresponding to a list of tabs of a user interface displayed on a screen of the computing device is received. The direction corresponding to the displayed list of tabs may, for example, be horizontal or vertical.

At step 1220, a distance of movement corresponding to the received multi-finger swipe gesture is determined. For example, the distance may be calculated based on information about a first and a second position corresponding to two points on the screen, as received and associated with the multi-finger swipe gesture.

At step 1230, a next tab position from the list of tabs is determined. A distance from a current tab (e.g., the Kth tab discussed in the example above) to the determined next tab is proportional to the determined distance of movement based on the received multi-finger swipe gesture. For example, the next tab position may be determined by selecting a tab corresponding proportionally to the distance moved on the screen and the number of tabs available in the list of tabs from a currently displayed tab. The determination of the next tab may be based on the distance of movement, and a starting tab or a currently displayed tab at the point of the multi-finger swipe gesture initiating.

The determination of the next tab position may also take into account a speed or acceleration of the swipe gesture or a size of tabs in the list of tabs. For example, a faster speed or acceleration may lead to a further tab being determined as the next tab for a particular distance moved. A smaller size of the tabs (indicating more tabs in the list of tabs) may lead to a further tab being determined as the next tab for a particular distance moved.

A tab determined to be the next tab may be updated with a highlight of the next tab to provide a user of the computing device feedback as to which tab corresponds to a current position of the swipe gesture. The highlighting may provide the user with a visual indication of whether or not the user has reached a desired tab for selection.

At step 1240, an end of swipe gesture event indicative of selection of the next tab position is received. For example, a user lifting the two or three fingers from which the swipe gesture is received may provide an indication of the end of a swipe gesture event. In the case where a pointing device is used to initiate the swipe gesture, releasing the button(s) that are used to initiate the swipe gesture may provide the indication of the end of swipe gesture event. In either case, receiving such an end of swipe gesture event provides an indication that the next tab position is selected to be set as the currently active tab.

At step 1250, instructions are provided for a graphical update of the user interface. The graphical update displays contents of a user interface associated with the next tab position. For example, where the currently displayed tab is the Kth tab of FIG. 9, a gesture in the 902 direction may lead to a distance corresponding to a N–7th tab. In such a case, a user interface (e.g., a webpage) associated with the N–7th tab would be displayed, making it the currently displayed tab.

Figure 13:
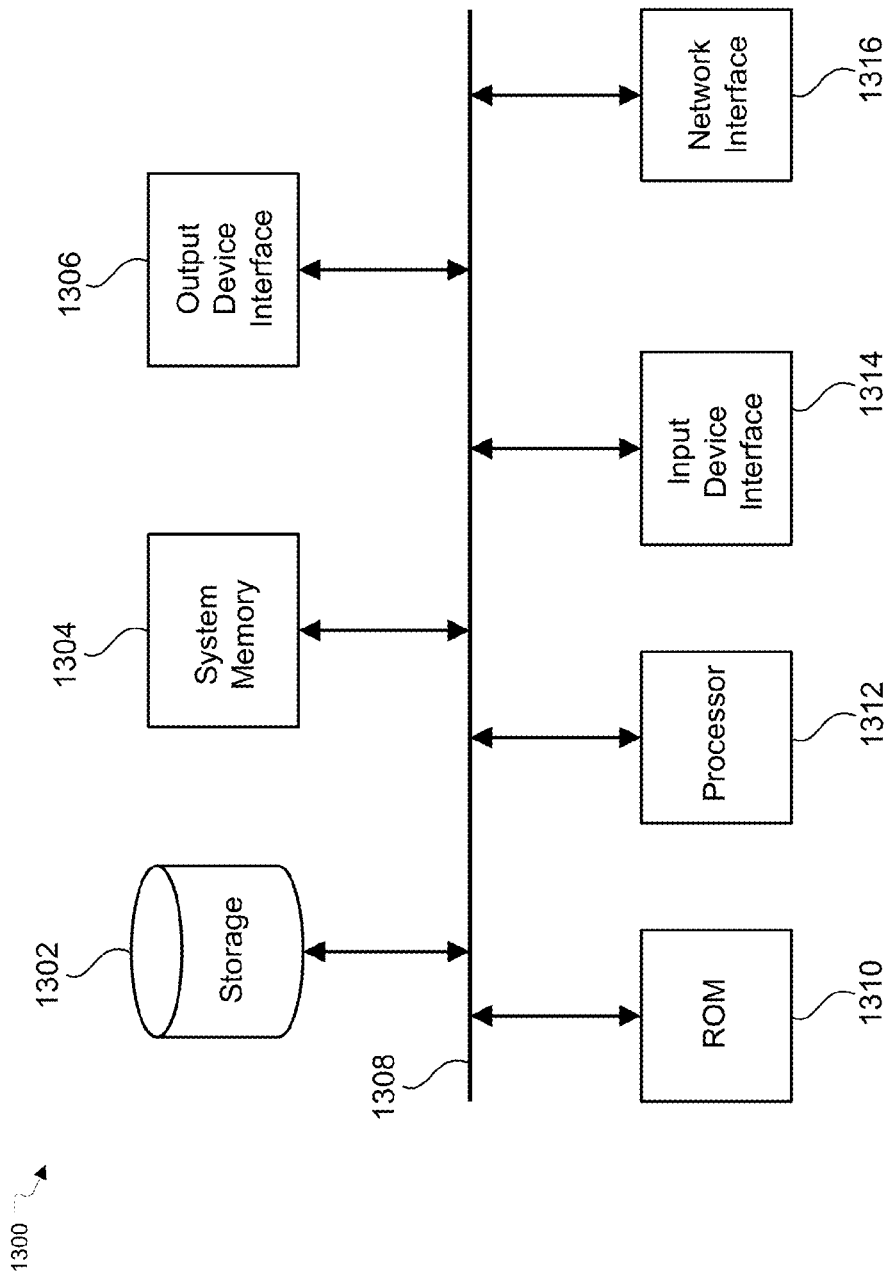
FIG. 13 conceptually illustrates an example of an electronic system, in accordance with various aspects of the subject technology.

FIG. 13 conceptually illustrates an electronic system 1300 with which some implementations of the subject technology are implemented. For example, one or more of the system 100 or the system 1000 may be implemented using the arrangement of the electronic system 1300. The electronic system 1300 can be a computer (e.g., a mobile phone, PDA), or any other sort of electronic device. Such an electronic system includes various types of computer readable media and interfaces for various other types of computer readable media. Electronic system 1300 includes a bus 1305, processing unit(s) 1310, a system memory 1315, a read-only memory 1320, a permanent storage device 1325, an input device interface 1330, an output device interface 1335, and a network interface 1340.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1320, the system memory 1315, and the permanent storage device 1325.

From these various memory units, the processing unit(s) 1310 retrieves instructions to execute and data to process in order to execute the processes of the subject technology. The processing unit(s) can be a single processor or a multi-core processor in different implementations.

The read-only-memory (ROM) 1320 stores static data and instructions that are needed by the processing unit(s) 1310 and other modules of the electronic system. The permanent storage device 1325, on the other hand, is a read-and-write memory device. This device is a non-volatile memory unit that stores instructions and data even when the electronic system 1300 is off. Some implementations of the subject technology use a mass-storage device (for example a magnetic or optical disk and its corresponding disk drive) as the permanent storage device 1325.

Other implementations use a removable storage device (for example a floppy disk, flash drive, and its corresponding disk drive) as the permanent storage device 1325. Like the permanent storage device 1325, the system memory 1315 is a read-and-write memory device. However, unlike storage device 1325, the system memory 1315 is a volatile read-and-write memory, such a random access memory. The system memory 1315 stores some of the instructions and data that the processor needs at runtime. In some implementations, the processes of the subject technology are stored in the system memory 1315, the permanent storage device 1325, or the read-only memory 1320. For example, the various memory units include instructions for tab scrubbing using navigation gestures in accordance with some implementations. From these various memory units, the processing unit(s) 1310 retrieves instructions to execute and data to process in order to execute the processes of some implementations.

The bus 1305 also connects to the input and output device interfaces 1330 and 1335. The input device interface 1330 enables the user to communicate information and select commands to the electronic system. Input devices used with input device interface 1330 include, for example, alphanumeric keyboards and pointing devices (also called "cursor control devices"). Output device interfaces 1335 enables, for example, the display of images generated by the electronic system 1300. Output devices used with output device interface 1335 include, for example, printers and display devices, for example cathode ray tubes (CRT) or liquid crystal displays (LCD). Some implementations include devices for example a touchscreen that functions as both input and output devices.

Finally, as shown in FIG. 13, bus 1305 also couples electronic system 1300 to a network (not shown) through a network interface 1340. In this manner, the electronic system 1300 can be a part of a network of computers, for example, a local area network (LAN), a wide area network (WAN), or an Intranet, or a network of networks, for example the Internet. Any or all components of electronic system 1300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as "aspect" does not imply that the aspect is essential to the subject technology or that the aspect applies to all configurations of the subject technology. A disclosure relating to an aspect may apply to all configurations, or one or more configurations. An aspect may refer to one or more aspects and vice versa. A phrase such as "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for tab switching, the method comprising:
   receiving a multi-finger swipe gesture event for a computing device along a direction that a list of tabs of a user interface is displayed on a screen of the computing device, the received multi-finger swipe gesture event comprising a first position and a second position on the screen;
   determining a distance of movement corresponding to the received multi-finger swipe gesture event based on the first position and the second position;
   determining a next tab for selection from the list of tabs based on the determined distance of movement as the multi-finger swipe gesture event is received and a number of tabs available in the displayed list of tabs;
   providing instructions for a first graphical update of the user interface indicative of the next tab for selection as the multi-finger swipe gesture event is received, wherein the first graphical update provides a graphical indication for the next tab without updating the user interface to display contents of a user interface associated with the next tab;
   receiving an end of swipe gesture event indicative of a user's desire to select the next tab; and
   providing instructions for a second graphical update of the user interface based on the receiving of the end of swipe gesture event, wherein the graphical update displays the contents of the user interface associated with the determined next tab.

2. The computer-implemented method of claim 1, wherein the first graphical update comprises highlighting the next tab.

3. The computer-implemented method of claim 1, wherein the receiving of the multi-finger swipe gesture event comprises a user of the computing device swiping three fingers on the screen of the computing device in the direction corresponding to the list of tabs of the user interface displayed on the screen.

4. The computer-implemented method of claim 1, wherein the receiving of the multi-finger swipe gesture event comprises a user of the computing device swiping two fingers on the screen of the computing device in the direction corresponding to the list of tabs of the user interface displayed on the screen.

5. The computer-implemented method of claim 1, wherein the receiving of the multi-finger swipe gesture event comprises a user of the computing device right-clicking a mouse device of the computing device and dragging the mouse device in the direction corresponding to the list of tabs of the user interface displayed on the screen.

6. The computer-implemented method of claim 1, wherein the receiving of the multi-finger swipe gesture event comprises a user of the computing device swiping multiple fingers on a trackpad device of the computing device.

7. The computer-implemented method of claim 1, wherein the determining of the next tab is further based on an acceleration of the multi-finger swipe gesture event.

8. The method of claim 1, wherein the determining of the next tab is further based on a size of the tabs in the list of tabs.

9. The method of claim 1, further comprising:
   providing instructions for one or more graphical updates of the user interface as the multi-finger swipe gesture event is being received, each of the one or more graphical updates providing a graphical indication for at least one tab among the list of tabs without updating the user interface to display contents of a user interface associated with the at least one tab.

10. The method of claim 9, wherein at least one graphical update of the one or more graphical updates comprises providing a highlight of the at least one tab associated with the at least one graphical update.

11. The method of claim 9, wherein the at least one tab of each of the one or more graphical updates is between the current tab and the next tab along the list of tabs.

12. The method of claim 1, wherein the determining of the next tab is further based on a speed of the multi-finger swipe gesture event.

13. A non-transitory computer-readable medium storing instructions that when executed cause a computer to perform operations for tab scrubbing, the operations comprising:
receiving a multi-finger swipe gesture event for a computing device along a direction that a list of tabs of a user interface is displayed on a screen of the computing device, the received multi-finger swipe gesture event comprising a first position and a second position on the screen;
determining a distance of movement corresponding to the received multi-finger swipe gesture event based on the first position and the second position;
determining a next tab from the list of tabs based on the determined distance of movement as the multi-finger swipe gesture event is received and a number of tabs available in the displayed list of tabs; and
providing instructions for a graphical update of the user interface indicative of the determined next tab as the multi-finger swipe gesture event is received, wherein the graphical update highlights the determined next tab without updating the user interface to display contents of a user interface associated with the determined next tab.

14. The non-transitory computer-readable medium of claim 13, wherein the receiving of the multi-finger swipe gesture event comprises a user of the computing device swiping three fingers on the screen of the computing device in the direction corresponding to the list of tabs of the user interface displayed on the screen.

15. The non-transitory computer-readable medium of claim 13, wherein the receiving of the multi-finger swipe gesture event comprises a user of the computing device swiping two fingers on the screen of the computing device in the direction corresponding to the list of tabs of the user interface displayed on the screen.

16. The non-transitory computer-readable medium of claim 13, wherein the receiving of the multi-finger swipe gesture event comprises a user of the computing device right-clicking a mouse device of the computing device and dragging the mouse device in the direction corresponding to the list of tabs of the user interface displayed on the screen.

17. The non-transitory computer-readable medium of claim 13, wherein the receiving of the multi-finger swipe gesture event comprises a user of the computing device swiping multiple fingers on a trackpad device of the computing device.

18. The non-transitory computer-readable medium of claim 13, further comprising instructions that cause a computer to perform operations comprising:
receiving an end of swipe gesture event indicative of selection of the determined next tab; and
providing instructions for a second graphical update of the user interface, wherein the second graphical update displays the contents of a user interface associated with the next tab.

19. The non-transitory computer-readable medium of claim 13, wherein the determining of the next tab is further based on a speed of the multi-finger swipe gesture event.

20. A computer-implemented system for tab selection, the system comprising:
one or more processors;
a memory comprising instructions which, when executed by the one or more processors, cause the one or more processors to:
receive a multi-finger swipe gesture event for a computing device along a direction that a list of tabs of a user interface is displayed on a screen of the computing device, the multi-finger swipe gesture event comprising a first position and a second position on the screen;
determine a distance of movement corresponding to the received multi-finger swipe gesture event based on the first position and the second position;
determine a next tab from the list of tabs based on the determined distance of movement as the multi-finger swipe gesture event is received and a number of tabs available in the displayed list of tabs;
provide instructions for a first graphical update of the user interface indicative of the next tab as the multi-finger swipe gesture event is received, wherein the first graphical update provides a graphical indication for the next tab without updating the user interface to display contents of a user interface associated with the next tab;
receive an end of swipe gesture event indicative of selection of the determined next tab; and
provide instructions for a second graphical update of the user interface based on receipt of the end of swipe gesture event, wherein the graphical update displays the contents of the user interface associated with the determined next tab.

21. The system of claim 20, wherein the determining of the next tab is further based on a speed of the multi-finger swipe gesture event.

* * * * *